US009232856B2

(12) United States Patent
Yaniak et al.

(10) Patent No.: US 9,232,856 B2
(45) Date of Patent: Jan. 12, 2016

(54) STRUCTURAL ARTICULATION JOINT FOR HIGH DENSITY MOBILE CARRIAGE

(71) Applicant: Spacesaver Corporation, Fort Atkinson, WI (US)

(72) Inventors: David Joseph Yaniak, Janesville, WI (US); James C. Muth, Oconomowoc, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 161 days.

(21) Appl. No.: 13/659,429

(22) Filed: Oct. 24, 2012

(65) Prior Publication Data

US 2013/0105428 A1    May 2, 2013

Related U.S. Application Data

(60) Provisional application No. 61/552,697, filed on Oct. 28, 2011.

(51) Int. Cl.
*A47B 53/00* (2006.01)
*A47B 55/00* (2006.01)
*F16B 12/44* (2006.01)
*B62B 1/10* (2006.01)
(Continued)

(52) U.S. Cl.
CPC ............... *A47B 55/00* (2013.01); *A47B 53/00* (2013.01); *B62B 1/10* (2013.01); *B65G 1/02* (2013.01); *B65G 1/10* (2013.01); *F16B 12/44* (2013.01); *Y10T 403/70* (2015.01)

(58) Field of Classification Search
CPC ......... F16B 12/44; F16B 12/52; A47B 53/00; A47B 55/00; B65G 1/02; B65G 1/10; Y10T 403/70

USPC .............. 211/1.51, 1.57, 85.8, 162, 189, 191, 211/192; 312/199, 200
See application file for complete search history.

(56) References Cited

U.S. PATENT DOCUMENTS 1,858,086  A  *  5/1932  House .............................. 99/467
3,575,479  A  *  4/1971  Kombuchen ................... 312/200
3,592,345  A  *  7/1971  Featherman ................... 211/191
(Continued)

FOREIGN PATENT DOCUMENTS

DE        2525655 A1  * 12/1976
GB        2032257 A   *  5/1980  .............. A47B 57/06

OTHER PUBLICATIONS

Canadian Patent Office Action dated Dec. 19, 2013.

*Primary Examiner* — Stanton L Krycinski
(74) *Attorney, Agent, or Firm* — Andrus Intellectual Property Law, LLP

(57) ABSTRACT

A structural coupler for joining two storage racks of a mobile rack system. The coupler includes three separate components that are movable relative to each other to allow for relative movement between adjacent storage racks while providing the structural stability to prevent tipping of the storage racks. The coupler includes a coupling bracket that includes a pair of tabs that extend through open slots formed in a movement bracket and through receiving slots formed in a receiving bracket. A removable connector prevents separation of the coupler in the assembled condition while the size of the coupling tabs relative to the open slots allows the three components to move relative to each other. A series of individual couplers can be used along the height of the uprights that form part of each of the individual storage racks.

9 Claims, 9 Drawing Sheets

(51) Int. Cl.
  *B65G 1/10*   (2006.01)
  *B65G 1/02*   (2006.01)

(56) References Cited

U.S. PATENT DOCUMENTS

| | | | | |
|---|---|---|---|---|
| 3,640,595 | A * | 2/1972 | Staller et al. | 312/198 |
| 3,724,389 | A * | 4/1973 | Greaves | 104/162 |
| 3,788,490 | A * | 1/1974 | Featherman | 211/191 |
| 3,802,574 | A * | 4/1974 | Weider | 211/134 |
| 3,829,189 | A * | 8/1974 | Staller | 312/198 |
| 3,944,309 | A * | 3/1976 | Taniwaki | 104/287 |
| 3,957,322 | A * | 5/1976 | Mastronardi et al. | 312/198 |
| 3,957,323 | A * | 5/1976 | Tucker et al. | 312/198 |
| 4,033,649 | A * | 7/1977 | Naito et al. | 312/201 |
| 4,039,040 | A * | 8/1977 | Spears et al. | 104/288 |
| 4,256,355 | A * | 3/1981 | Yamaguchi et al. | 312/198 |
| 4,412,772 | A * | 11/1983 | Naito et al. | 312/199 |
| 4,432,589 | A * | 2/1984 | Sattel | 312/198 |
| 4,437,711 | A * | 3/1984 | Dahnert | 312/201 |
| 4,441,617 | A * | 4/1984 | Forsberg | 211/1.57 |
| 4,462,500 | A * | 7/1984 | Konstant et al. | 211/151 |
| 4,759,592 | A * | 7/1988 | Dahnert | 312/201 |
| 4,778,067 | A * | 10/1988 | Bellerose | 211/187 |
| 4,783,618 | A * | 11/1988 | Artrip | 318/587 |
| 5,160,190 | A * | 11/1992 | Farrell et al. | 312/201 |
| 5,417,332 | A * | 5/1995 | Gearin et al. | 211/85.8 |
| 5,445,278 | A * | 8/1995 | Gearin et al. | 211/85.8 |
| 5,470,490 | A * | 11/1995 | Gearin et al. | 211/85.8 |
| 5,482,167 | A * | 1/1996 | Gearin et al. | 211/85.8 |
| 5,553,716 | A * | 9/1996 | Gearin et al. | 211/85.8 |
| 5,630,515 | A * | 5/1997 | Gearin et al. | 211/85.8 |
| 5,636,750 | A * | 6/1997 | Heyl | 211/1.57 |
| 5,765,701 | A * | 6/1998 | Gearin et al. | 211/85.8 |
| 5,909,816 | A * | 6/1999 | Gearin et al. | 211/85.8 |
| 6,119,877 | A * | 9/2000 | Gearin et al. | 211/85.8 |
| 6,260,718 | B1 * | 7/2001 | Gearin et al. | 211/85.8 |
| 6,378,708 | B2 * | 4/2002 | Gearin et al. | 211/85.8 |
| 6,497,328 | B2 * | 12/2002 | Gearin et al. | 211/85.8 |
| 6,640,984 | B2 * | 11/2003 | Gearin et al. | 211/85.8 |
| 6,644,484 | B1 * | 11/2003 | Sardis | 211/190 |
| 6,845,834 | B2 * | 1/2005 | Hatanaka | 180/167 |
| 7,032,762 | B2 * | 4/2006 | Miyazaki et al. | 211/162 |
| 7,261,210 | B2 * | 8/2007 | Hatanaka | 211/1.51 |
| 8,443,990 | B2 * | 5/2013 | Tourdot et al. | 211/85.8 |
| 8,607,911 | B2 * | 12/2013 | Tsujimoto et al. | 180/167 |
| 2002/0084236 | A1 * | 7/2002 | Gearin et al. | 211/85.8 |
| 2002/0131849 | A1 * | 9/2002 | Hatanaka | 414/281 |
| 2003/0052072 | A1 * | 3/2003 | Gearin et al. | 211/85.8 |
| 2004/0004051 | A1 * | 1/2004 | Miyazaki et al. | 211/162 |
| 2004/0195803 | A1 * | 10/2004 | Brown | 280/504 |
| 2005/0184018 | A1 * | 8/2005 | Miyazaki et al. | 211/162 |
| 2005/0224427 | A1 * | 10/2005 | Hatanaka | 211/1.51 |
| 2006/0043739 | A1 * | 3/2006 | Gogel | 292/148 |
| 2010/0200528 | A1 | 8/2010 | Tourdot et al. | |
| 2012/0006765 | A1 * | 1/2012 | Tsujimoto et al. | 211/1.57 |

* cited by examiner

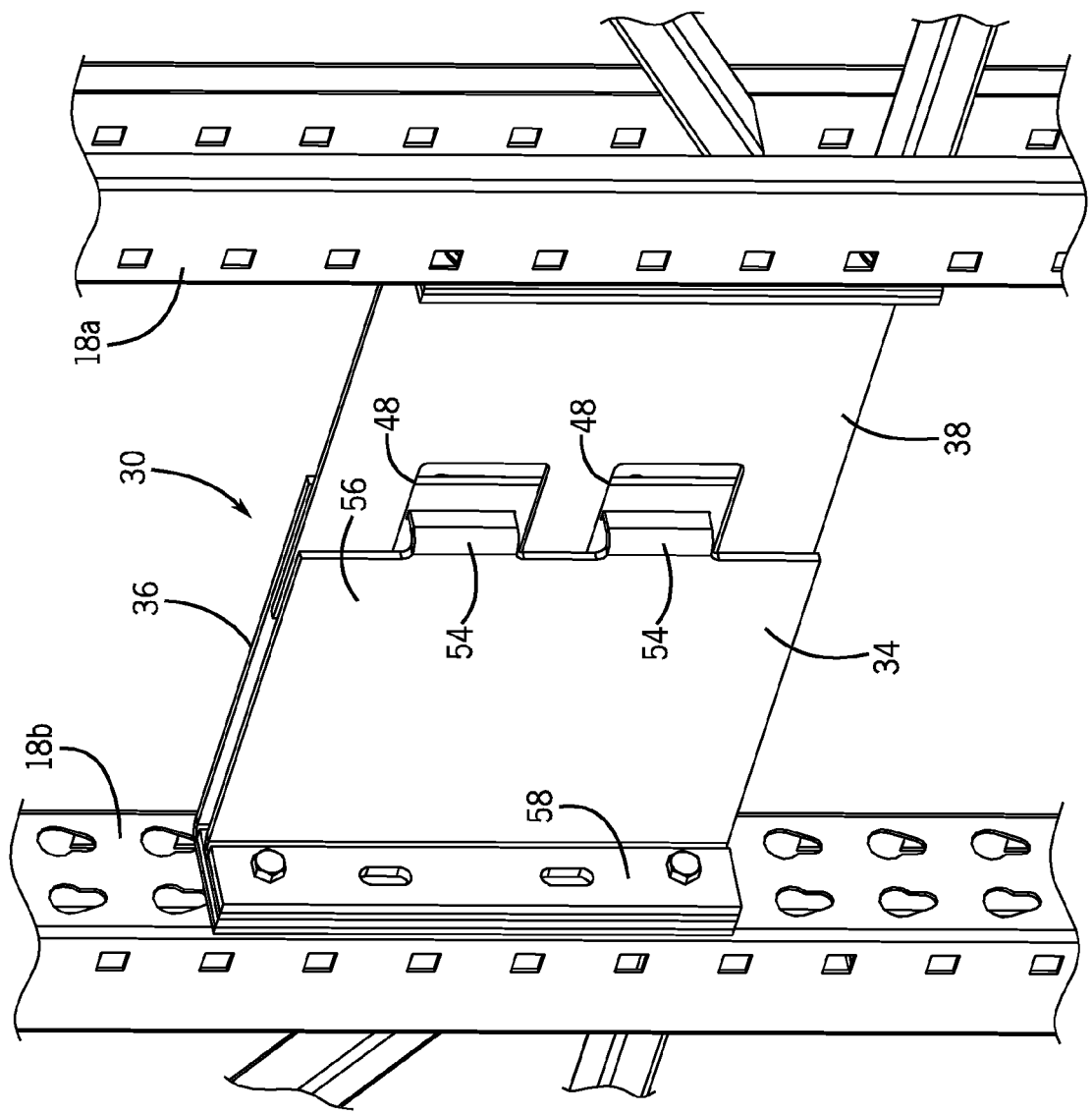

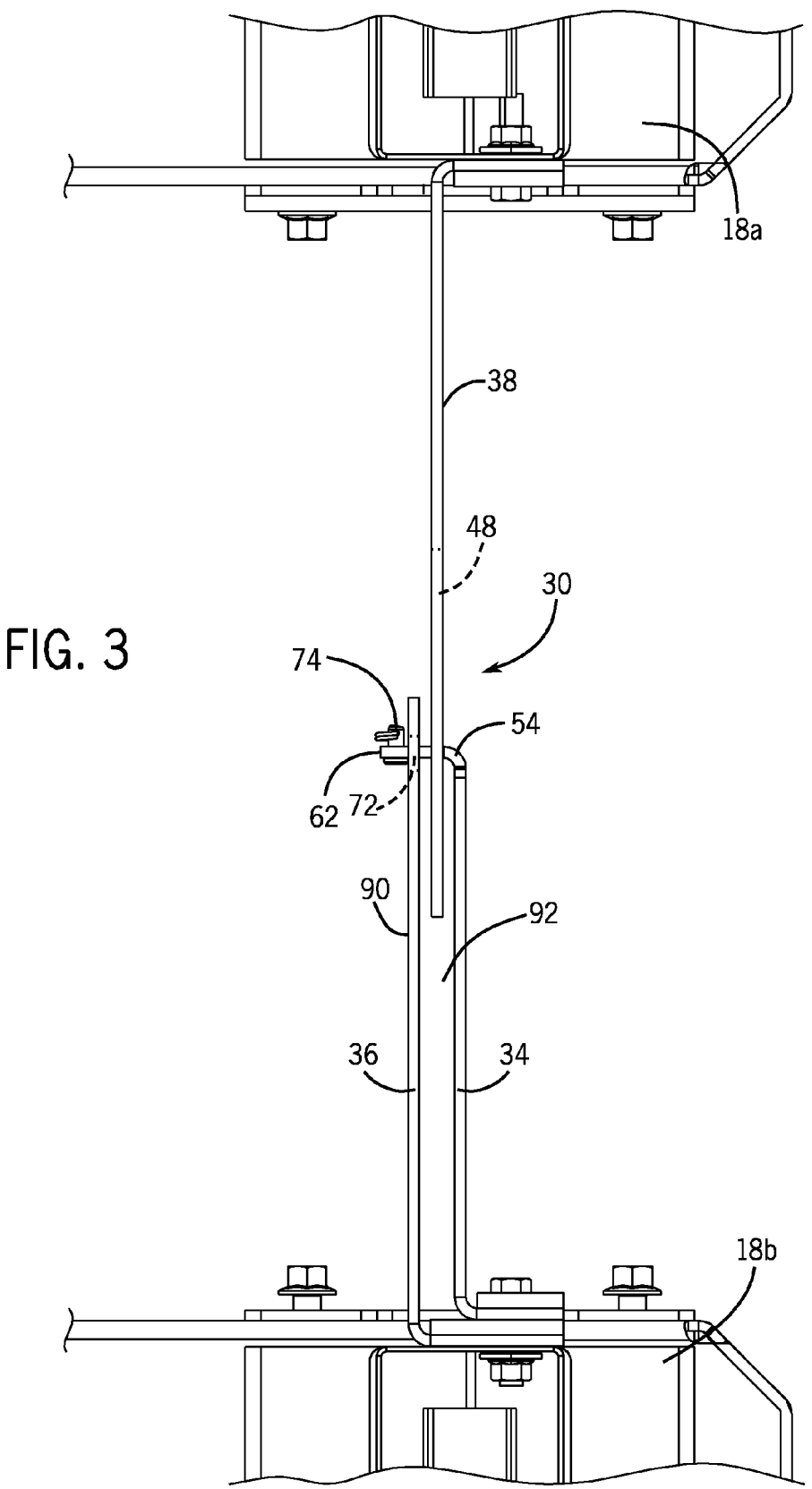

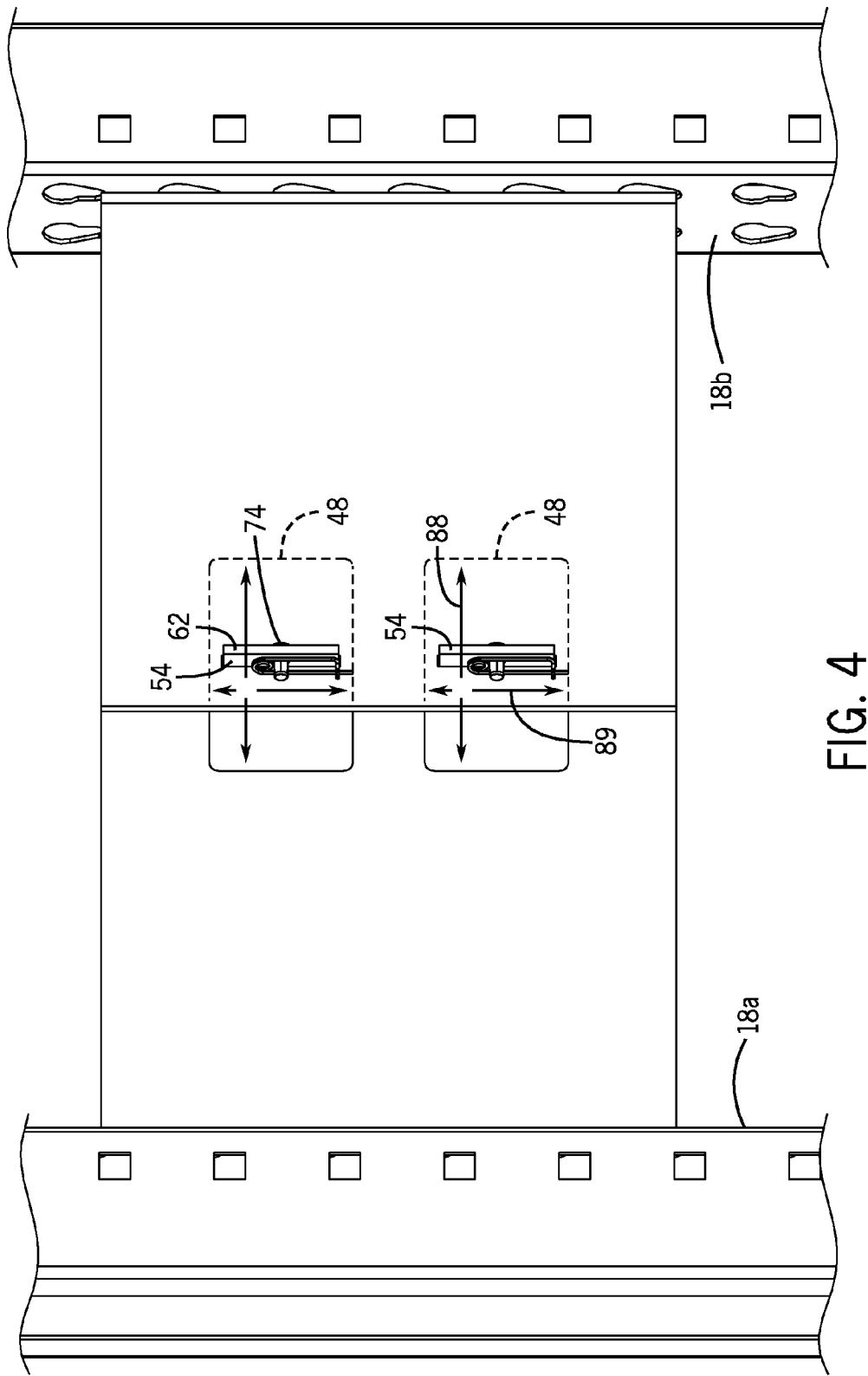

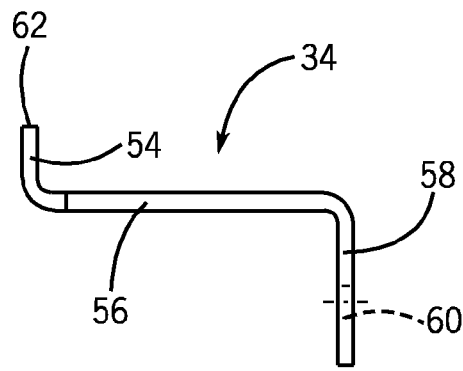
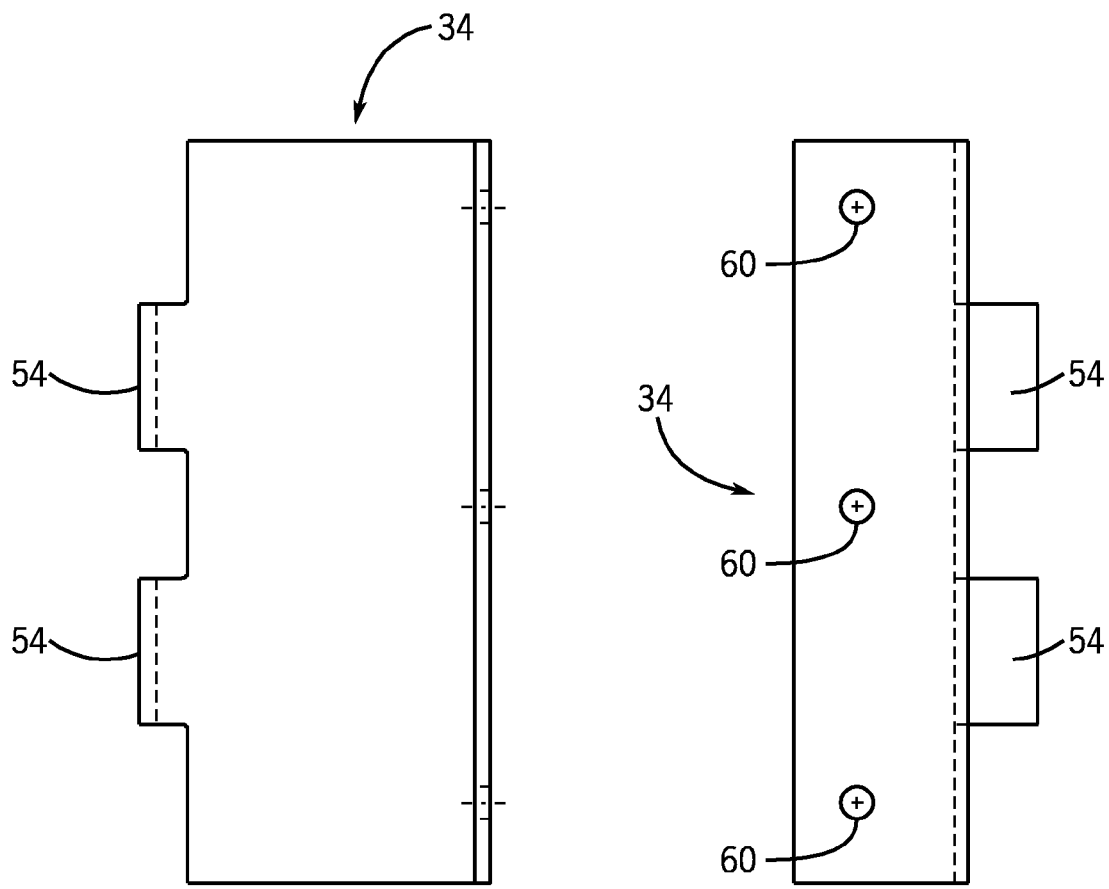
FIG. 6a
FIG. 6b
FIG. 6c

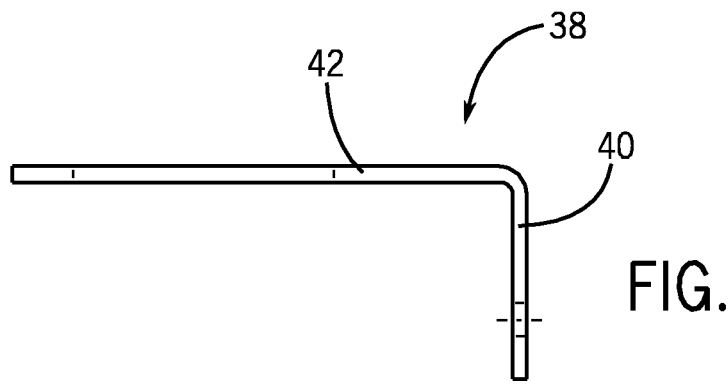
FIG. 7a
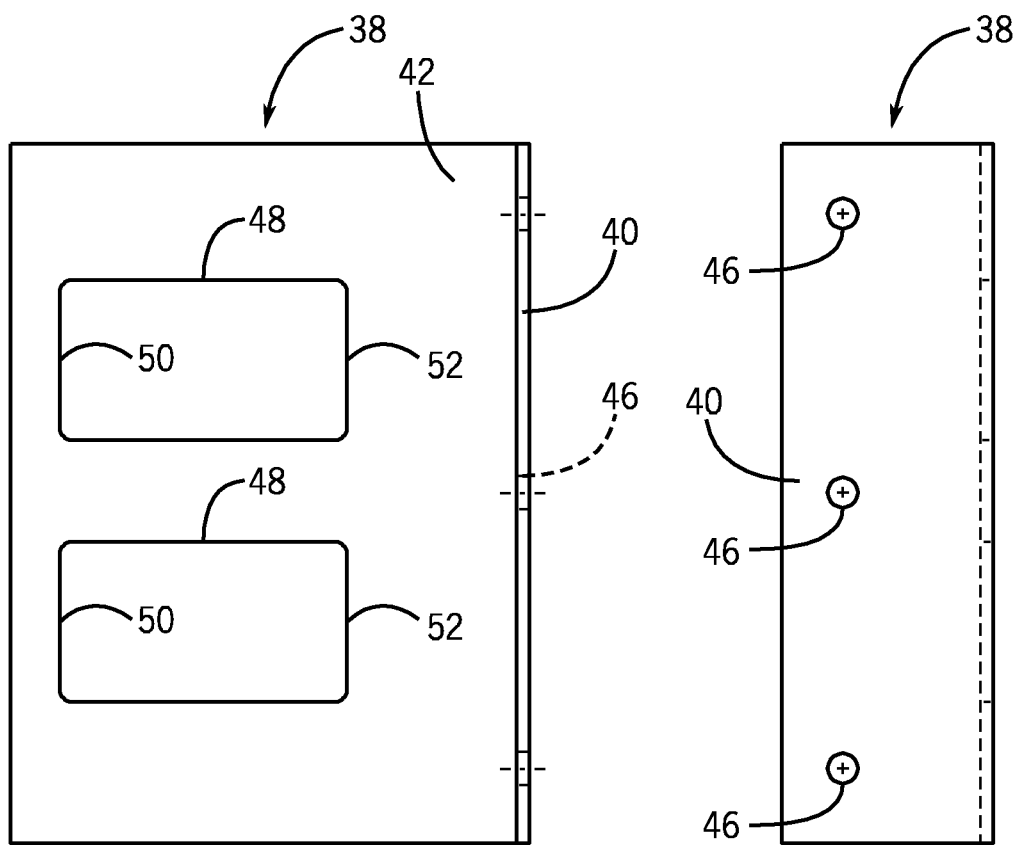
FIG. 7b
FIG. 7c

STRUCTURAL ARTICULATION JOINT FOR HIGH DENSITY MOBILE CARRIAGE

CROSS-REFERENCE TO RELATED APPLICATION

The present application is based on and claims priority to U.S. Provisional Patent Application Ser. No. 61/552,697 filed Oct. 28, 2011.

BACKGROUND OF THE INVENTION

The present disclosure generally relates to industrial storage systems and, more particularly, to a mobile industrial rack system for use in areas having seismic activity or on unleveled flooring.

Industrial rack systems are commonly used in storage facilities to store products until those products are shipped either directly to a consumer or to a retailer. Typically, the industrial racks store loaded pallets that are placed on and removed from the racks using a forklift. The industrial racks are spaced from one another in a manner to form relatively wide aisles to allow sufficient room for the forklift to load and remove the pallets. Since each industrial rack has a fixed position, each industrial rack must have a dedicated aisle. Moreover, since each aisle is typically as wide, if not wider than, the rack itself, more than half the floor space occupied by the industrial rack system may be occupied by aisles and thus not usable for product storage.

Mobile industrial rack systems, however, are designed to reduce the number of fixed aisles and, as a result, increase the amount of floor space used for product storage. More particularly, in a typical configuration, a single aisle may be allocated for the entire industrial rack system. The position of that single aisle can be changed by moving the industrial racks along a track or rail that is mounted or otherwise secured to the storage facility flooring, which is typically a concrete slab. While in some configurations each industrial rack is moved independently, it is common for back-to-back industrial racks to be coupled using a rigid flue spacer connector and moved as a single multi-rack unit by a single mobile carriage supporting both racks. To access a forward rack of a given back-to-back configuration, the racks are moved such that an aisle is formed immediately forward of the back-to-back configuration. To access a rearward rack of the given back-to-back configuration, the racks are moved such that an aisle is formed immediately rearward of the back-to-back configuration. Mobile industrial rack systems provide nearly twice the storage capacity of a similarly sized fixed rack system.

Conventional mobile industrial rack systems must roll on leveled rail such that the heavy loading of the industrial racks does not create an undesired imbalance as the racks are being moved. Thus, in a typical implementation, the existing concrete floor of a storage facility, which is generally not level within the specifications required for the mobile industrial rack system, must be leveled by applying a thin coat of concrete material to the concrete floor. The rails along which the racks move are then anchored through the thin coat of concrete material and to the concrete floor. Alternately, footings may be poured beneath the concrete floor and the rails anchored to the footings beneath the concrete floor. A similar thin coat of concrete material is then poured around the rail to provide a leveled floor surface. Grout or similar material is typically placed between the rails and the concrete floor or footings. In both instances, measures must be taken to provide a level surface for the rails along which the racks move, which are generally quite costly.

In areas in which there is a relatively high frequency of seismic activity, rigid connectors are often required between the two racks of a multi-rack unit to withstand seismic activity. The rigid connectors used between the two racks of a multi-rack unit somewhat limits the degree to which the floor can be uneven. Thus, a connector that allows for relative movement between the two racks of a multi-rack unit increases the use and availability for the mobile industrial rack system.

SUMMARY OF THE INVENTION

The present disclosure is directed to a mobile industrial rack system usable in areas having seismic activity. The mobile rack system includes one or more spaced couplers positioned between the vertical uprights of adjacent racks of a multi-rack unit that provide the structural stability between the racks while still allowing the racks to move relative to each other, such as during seismic activity.

Each coupler used between adjacent racks is formed from three separate components that interact and engage each other. The coupler includes a coupling bracket, a receiving bracket and a movement bracket. The couplers are each mounted in the flue space between adjacent storage racks. The coupling bracket and receiving bracket are mounted to the same upright of one storage rack. The coupling bracket includes a coupling tab that passes through movement slots formed in the movement bracket mounted to the opposite storage rack. Each of the coupling tabs extends through slots formed in the receiving bracket. Each of the coupling tabs receives a removable connector that prevents separation of the individual components of the coupler while allowing relative movement between the individual components.

The coupler of the present disclosure forms a structural articulation joint between adjacent racks of a mobile industrial rack system. The articulation joint created by the couplers provides a strong movement connection between two coupled storage racks such that the two storage racks can be considered as a single unit for purposes of evaluating their stability when subjected to overturning forces. The coupler allows for relative movement between the adjacent racks while still providing the required structural stability between the adjacent racks.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 2a is a magnified view of a coupler used to join a pair of storage racks of the mobile industrial rack system of FIG. 1;

FIG. 2b is a perspective view of the coupler similar to the view in FIG. 2a;

FIG. 3 is a top view of the coupler shown in FIG. 2;

FIG. 4 is a rear perspective view of the coupler shown in FIG. 3;

FIGS. 6a-6c show the coupling bracket that forms part of the coupler;

FIGS. 7a-7c illustrate the movement bracket that forms part of the coupler.

DETAILED DESCRIPTION OF THE INVENTION

Figure 1:
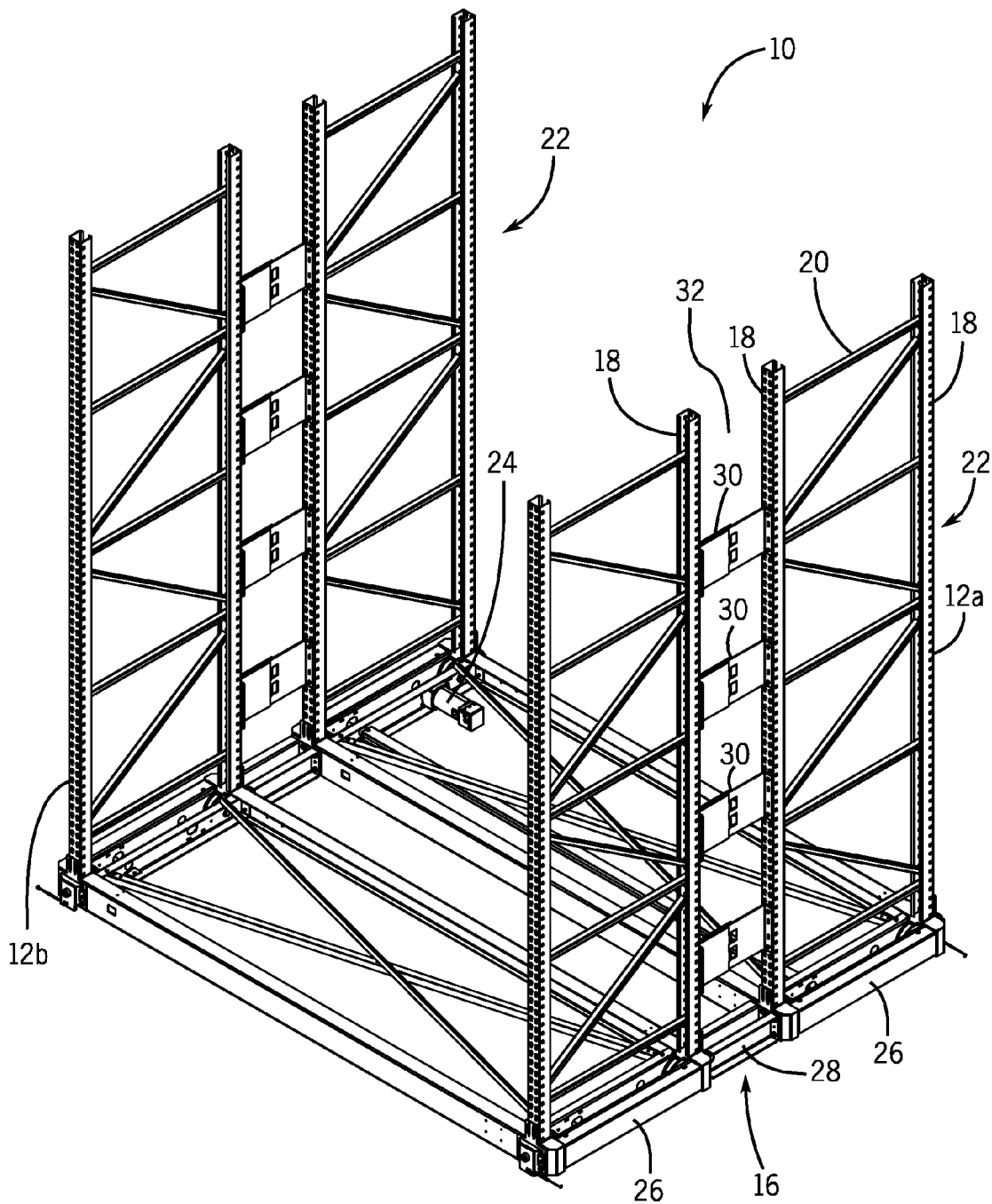
FIG. 1 is an isometric view of a representative embodiment of a mobile industrial rack system incorporating the features of the present disclosure.

FIG. 1 illustrates a mobile industrial rack system 10 that includes a series of industrial storage racks 12 that are movable along a series of spaced and parallel rails (not shown) that are mounted within the floor of a building. In the embodiment shown, the industrial storage racks 12 are arranged in pairs so as to form multiple multi-rack units 16, with each multi-rack unit 16 having a forward rack 12a and a rearward rack 12b, wherein the multi-rack unit 16 is movable as a single unit. Each multi-rack unit 16 is associated with a control interface that controls movement of the industrial storage racks 12 along the rails mounted to the building floor.

As illustrated in FIG. 1, each end of the individual racks 12 includes a pair of vertical uprights 18 that are joined to each other by a series of braces 20. The series of braces 20 and uprights 18 create a relatively rigid end frame 22 for each of the racks 12. Although not illustrated in FIG. 1, shelving is positioned between the pair of spaced end frames 22 to support items along each of the individual racks 12.

The multi-rack unit 16 shown in FIG. 1 is driven by a single motor 24 that operates to rotate a series of support wheels for the unit 16. In this manner, the entire multi-rack unit 16 is movable along the spaced rails mounted to the building floor.

As illustrated in FIG. 1, the lower frame members 26 of each storage rack 12 are joined to each other by a series of connecting beams 28. Although the lower end of each rack 12 is joined by the connecting beams 28, a series of couplers 30 are used to join adjacent uprights 18 of the pair of storage racks 12. The couplers 30 shown in FIG. 1 are configured and designed to allow the individual racks 12 to move relative to each other to provide an articulating structural connection in the flue space 32 between the individual racks 12 of the multi-rack unit 16. The couplers 30 are each configured to provide a joint between the pair of racks 12a and 12b to provide a strong connection between the racks while allowing the racks to move relative to each other. The relative movement between the two racks 12a and 12b allows the unit to compensate for either an uneven floor or seismic acceleration that may take place during an earthquake. The use of the couplers 30 is particularly desirable when the mobile industrial rack system 10 of the present disclosure is installed in a seismic region.

In the embodiment illustrated in FIG. 1, four separate couplers 30 are positioned in the flue space 32 between the adjacent racks 12a, 12b that form part of the coupled unit 16. However, it should be understood that fewer or more couplers 30 could be utilized depending upon the overall size, arrangement, or loading of each of the storage racks 12.

Figure 2B:
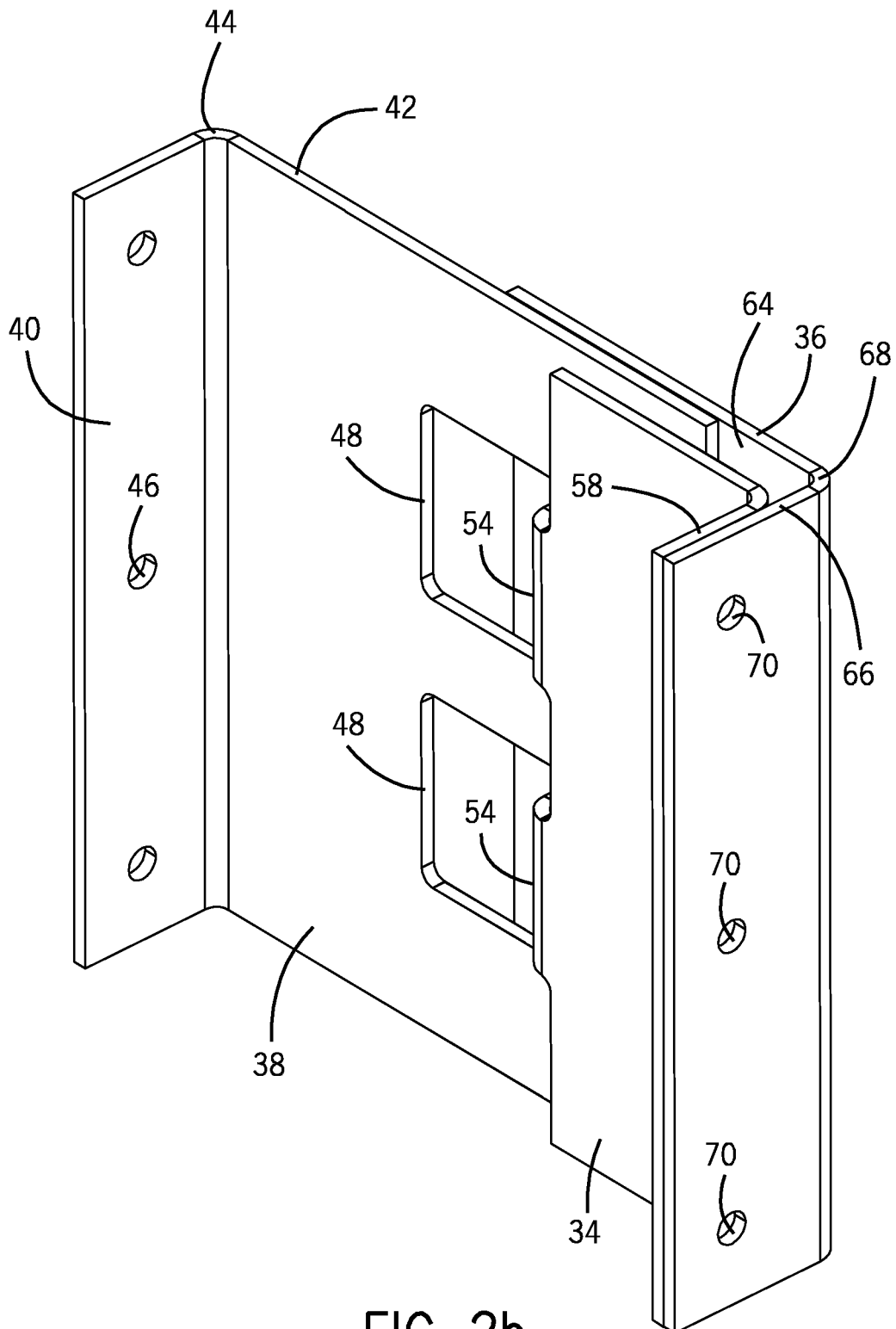

Referring now to FIGS. 2a and 2b, the individual coupler 30 is shown connected between the pair of spaced uprights 18a and 18b. The coupler 30 generally includes a coupling bracket 34 and a receiving bracket 36 mounted to upright 18b and a movement bracket 38 mounted to the opposite upright 18a. The details of each of the components of the coupler 30 will be described in greater detail below.

Referring now to FIG. 2b, the movement bracket 38 includes a mounting flange 40 and a movement plate 42 integrally joined to each other along a corner 44. The mounting flange 40 includes a series of mounting holes 46 that each receive a connector to hold the movement bracket 38 on one of the uprights.

The movement bracket 38 includes a pair of movement slots 48 formed in the movement plate 42. As illustrated in FIG. 7b, each of the movement slots 48 extends from a first end 50 to a second end 52 to define the range of movement for the coupler.

Referring back to FIGS. 2a and 2b, the coupling bracket 34 includes a pair of coupling tabs 54 that each extend at a 90° angle relative to the coupling plate 56. The coupling plate 56 in turn is connected to a flange 58 having a series of mounting holes 60 that allow the coupling bracket 34 to be mounted to one of the uprights 18b.

As best seen in FIG. 6a, each of the coupling tabs 54 extends at a 90° angle relative to the coupling plate 56 and terminates at an end 62. In the embodiment shown in FIGS. 6a-6c, the coupling bracket 34 is formed from a single piece of metallic material bent to the shape and configuration shown.

As illustrated in FIGS. 2a and 2b, the width of the coupling tab 54 is less than the width of the open slot 48 formed in the movement bracket 38. Thus, when the coupler 30 is assembled as shown in FIGS. 2a and 2b, each of the coupling tabs 54 extends through one of the open slots 48 and is movable along the length of the open slot 48.

Referring back to FIGS. 2a and 2b, the coupler further includes the receiving bracket 36 mounted to the same upright 18b as the coupling bracket 34. The receiving bracket 36 includes a plate 64 connected to a mounting flange 66 along the corner 68. The mounting flange 66 includes a series of mounting holes 70. When the mounting flange 58 of the coupling bracket is positioned adjacent to the mounting flange 66 of the receiving bracket 36, the mounting holes of each component are aligned with each other as shown in FIG. 2b such that common connectors can be used to secure the components to the upright 18b.

Figure 8A:
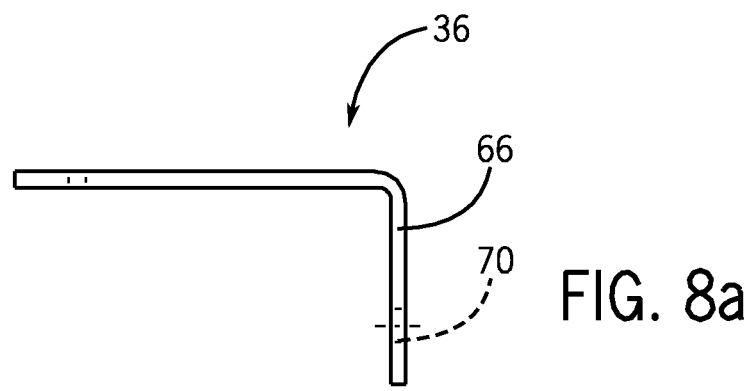
FIGS. 8a-8c illustrate the receiving bracket that forms part of the coupler.
Figure 8B:
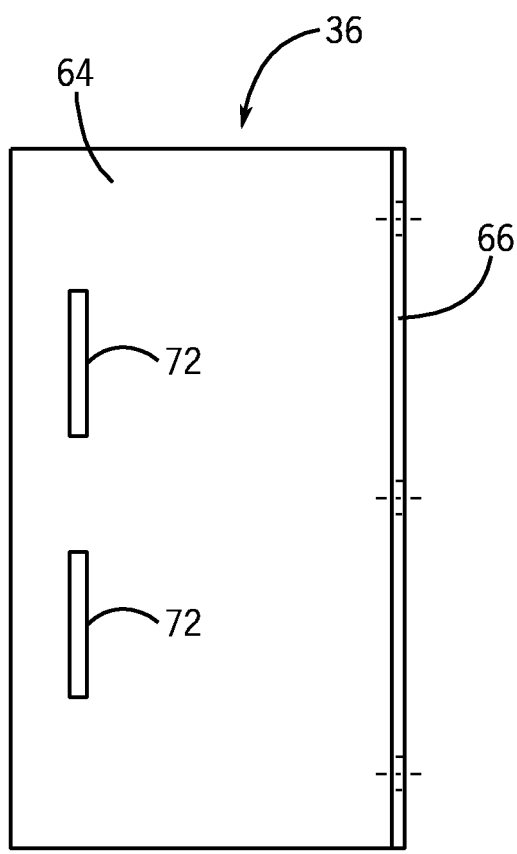
Figure 8C:
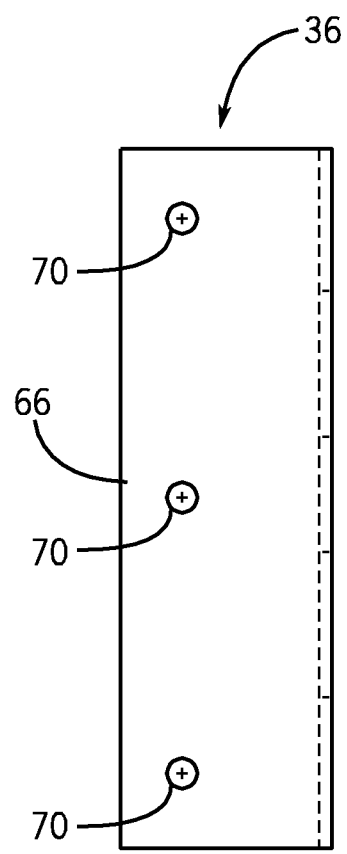

Referring now to FIG. 8b, the plate 64 includes a pair of receiving slots 72. Each of the receiving slots 72 has a width approximately equal to the width of the slots 48 formed in the movement plate 42 (FIG. 7b). The width of the receiving slots 72 is slightly greater than the width of the coupling tabs 54 formed as part of the coupling bracket 34 (FIG. 6a).

In the embodiment of the disclosure shown in FIGS. 2a and 2b, the coupling bracket 34, the receiving bracket 36 and the movement bracket 38 are each formed from a plate of steel having a uniform thickness and bent and stamped to the desired configuration shown.

FIG. 3 illustrates the coupler 30 of the present disclosure assembled and mounted between a pair of the uprights 18a and 18b. As illustrated, both the coupling bracket 34 and the receiving bracket 36 are mounted to the same upright 18b while the movement bracket 38 is mounted to the opposite upright 18a. As illustrated, the coupling tabs 54 of the coupling bracket 34 extend through the movement slots 48 formed in the movement bracket 38. The end 62 of each coupling tab 54 extends through one of the receiving slots 72 formed as part of the receiving bracket 36. The end 62 of the coupling tabs 54 is held in this position by a removable connector 74.

Figure 5:
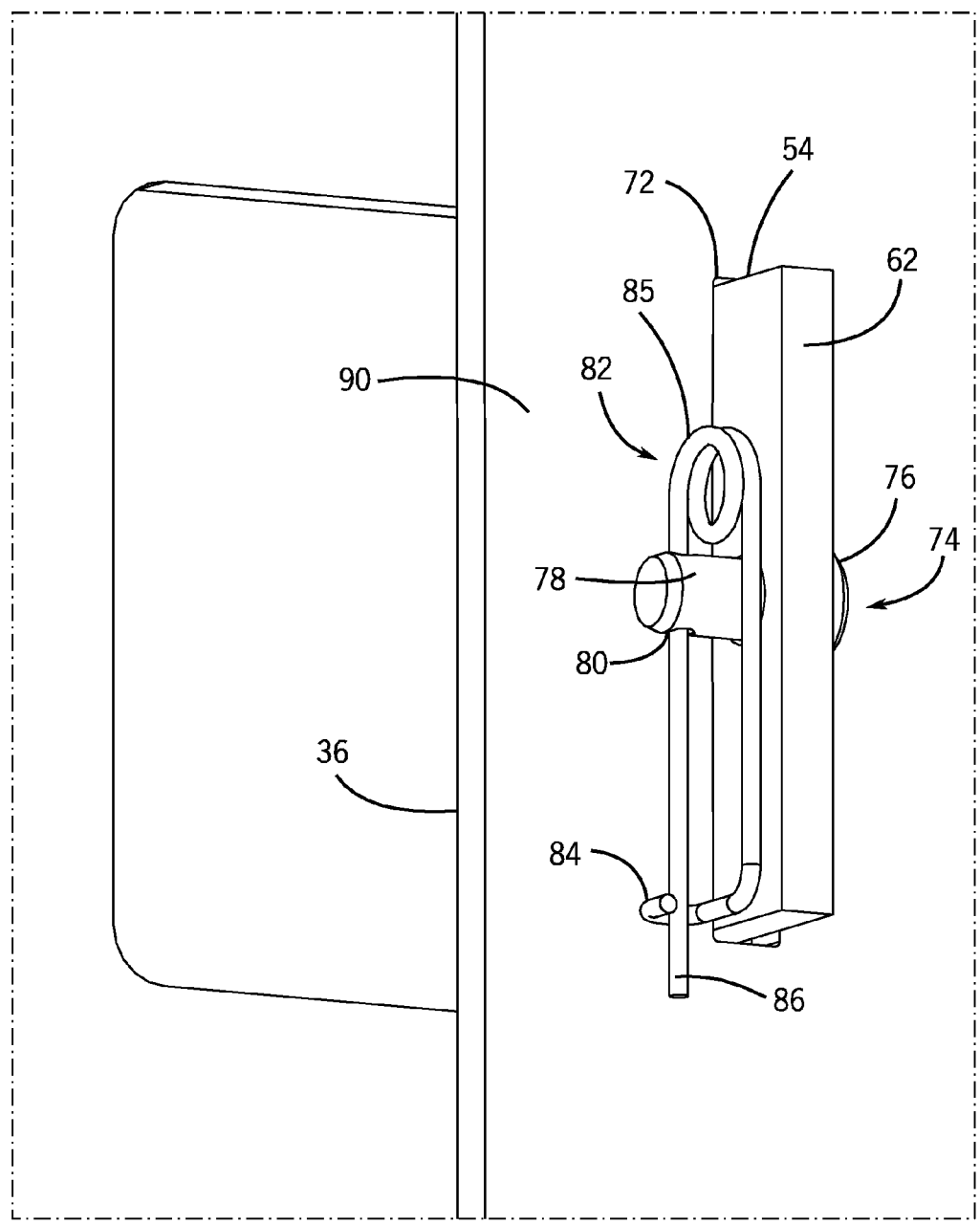
FIG. 5 is a further magnified view of a retaining pin used to hold the coupler in the coupled condition.

The configuration of the removable connector 74 is best shown in FIGS. 4 and 5. As illustrated in FIG. 4, the removable connector 74 extends through the coupling tab 54. In the embodiment shown in FIG. 5, the removable connector 74 is a bolt having a head 76 and a shaft 78. The shaft 78 includes a hole 80 that receives a retainer 82. The retainer 82 includes a bent latch portion 84 that receives the generally straight locking portion 86. As illustrated in FIG. 5, the retainer 82 can be removed by flexing the straight locking portion 86 against the coil spring portion 85 and out of the latch portion 84 and removing the straight locking portion 86 from the hole 80. Although the one specific configuration for the retainer 82 is shown in FIG. 5, it should be understood that the retainer 82 could be replaced by other types of mounting arrangements.

Referring back to FIG. 4, when the coupling tab 54 is retained as illustrated, the removable connector 74 prevents separation of the coupler while allowing the coupling tab 54 to move in either direction within the open slots 48, as illustrated by arrows 88. In addition to the movement in the direction shown by arrows 88 in FIG. 4, the components of the coupler 30 can also move in the vertical direction, as shown by arrows 89 also in FIG. 4. The movement in the vertical direction shown by arrows 89 is possible due to the size difference between the coupling tab 54 and the open slots 48. Further, the coupling tab 54 is able to move in a third, orthogonal direction due to the slight spacing between the removable connector 74 and a face surface 90 of the receiving bracket 36, as shown in FIGS. 3 and 5. As illustrated in FIG. 3, an open space 92 is formed between the coupling bracket 34 and the receiving bracket 36. The open space 92 further allows for movement between the movement bracket 38 and the coupling bracket 34 and the receiving bracket 36 in the assembled condition shown in FIG. 3. The open space 92 is created by the bent configuration of the coupling tab 54.

The movement of the coupling tabs 54 within the slots 48 allows the distance between the pair of uprights 18 to vary, such as during movement of the unit over an uneven floor. The use of the couplers shown in FIG. 1 allows for the required structural strength to allow the combined units to be evaluated as a single unit while still allowing the required flexibility of movement between the two storage racks.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A mobile rack system movable along a floor of a storage location, comprising:
    at least one multi-rack unit including a first storage rack and a second storage rack, each of the first and second storage racks including a plurality of vertical uprights;
    a drive motor operable to move the multi-rack unit along the floor; and
    a plurality of couplers extending between one of the uprights of the first storage rack and one of the uprights of the second storage rack to secure the first and second storage racks to each other while allowing relative movement therebetween, wherein each of the couplers comprises:
        a coupling bracket attached to a first upright of the first storage rack, the coupling bracket including a coupling plate and at least one coupling tab unitarily formed with and perpendicular to the coupling plate;
        a movement bracket attached to a second upright of the second storage rack and having at least one movement slot sized to receive the coupling tab to allow the coupling tab to move therein; and
        a receiving bracket attached to the first upright of the first storage rack and having at least one receiving slot sized to receive the coupling tab, wherein the movement bracket is movably positioned between the coupling bracket and the receiving bracket and the coupling tab passes through the movement slot and into the receiving slot.

2. The mobile rack system of claim 1 wherein each of the coupling brackets includes a pair of coupling tabs, each of the movement brackets includes a pair of movement slots and each of the receiving brackets includes a pair of receiving slots.

3. The mobile rack system of claim 2 wherein each of the movement slots has a longitudinal length and a width, wherein the width of each of the movement slots is greater than a width of each of the coupling tabs such that the coupling tabs are movable both along the longitudinal length of the movement slots and along the width of the movement slots.

4. The mobile rack system of claim 3 wherein the longitudinal length of each of the movement slots is defined by a first end and a second end, wherein the first and second ends contact the coupling tabs to limit the longitudinal movement of the coupling tabs.

5. The mobile rack system of claim 4 further comprising a removable connector extending through an end of each of the coupling tabs to secure the coupling tabs relative to the receiving bracket.

6. The mobile rack system of claim 5 wherein the removable connector includes a bolt extending through a hole formed in the coupling tab and a retainer extending through the bolt to hold the bolt within the hole formed in the coupling tab.

7. A mobile rack system movable along a floor of a storage location, comprising:
    at least one multi-rack unit including a first storage rack and a second storage rack, each of the first and second storage racks including a plurality of vertical uprights;
    a drive motor operable to move the multi-rack unit along the floor;
    a plurality of couplers extending between the first and second storage racks to secure the uprights of the first and second storage racks to each other while allowing relative movement therebetween, each of the plurality of couplers comprising:
        a coupling bracket attached to a first upright of the first storage rack, the coupling bracket including a coupling plate and a pair of coupling tabs unitarily formed with and perpendicular to the coupling plate;
        a movement bracket attached to a second upright of the second storage rack and having a pair of movement slots sized to receive the coupling tabs to allow the coupling tabs to move therein; and
        a receiving bracket attached to the first upright of the first storage rack and having a pair of receiving slots sized to receive the coupling tabs, wherein the movement bracket is positioned between the coupling bracket and the receiving bracket and the pair of coupling tabs pass through the movement slots and into the receiving slots; and
        a removable connector extending through an end of each of the coupling tabs to secure the coupling tab relative to the receiving bracket and to entrap the movement bracket between the coupling bracket and the receiving bracket.

8. The mobile rack system of claim 7 wherein the removable connector includes a bolt extending through a hole formed in the coupling tab and a retainer extending through the bolt to hold the bolt within the hole formed in the coupling tab.

9. The mobile rack system of claim 7 wherein each of the movement slots has a longitudinal length and a width, wherein the width of each of the movement slots is greater than a width of each of the coupling tabs such that the coupling tabs are movable both along the longitudinal length of the movement slots and along the width of the movement slots.

* * * * *